US006119749A

United States Patent [19]

Matsuzawa

[11] Patent Number: 6,119,749

[45] Date of Patent: Sep. 19, 2000

[54] TAPING DEVICE

[75] Inventor: Susumu Matsuzawa, Iwate, Japan

[73] Assignee: Sumitomo Wiring Systems, Ltd., Yokkaichi, Japan

[21] Appl. No.: 09/236,284

[22] Filed: Jan. 22, 1999

[30] Foreign Application Priority Data

Jan. 23, 1998 [JP] Japan .................................. 10-011627

[51] Int. Cl.[7] ................................ B26D 5/26; B32B 1/08

[52] U.S. Cl. .......................... 156/353; 156/361; 156/368; 156/458

[58] Field of Search .................................... 156/353, 368, 156/367, 187, 426, 428, 429, 446, 458, 468, 475, 195, 191, 184, 185, 361; 242/431, 178, 439, 448, 448.1, 444.1, 444.5; 174/72 A; 53/399, 589

[56] References Cited

U.S. PATENT DOCUMENTS 5,330,608 7/1994 Kemmler et al. ...................... 156/361

FOREIGN PATENT DOCUMENTS 59-224013 12/1984 Japan .
6-183413 7/1994 Japan .
6-183414 7/1994 Japan .
7-61415 3/1995 Japan .

OTHER PUBLICATIONS

An English Language Abstract of JP No. 07–61415.
An English Language Abstract of JP No. 06–183413.
An English Language Abstract of JP No. 59–224013.
An English Language Abstract of JP No. 06–183414.

*Primary Examiner*—Richard Crispino
*Assistant Examiner*—George R. Koch, III
*Attorney, Agent, or Firm*—Greenblum & Bernstein, P.L.C.

[57] ABSTRACT

The present invention enables efficient taping of a short length electric wire that is taped by a taping head. Namely, an electric wire hand is provided for removing an electric wire after taping from an electric wire clamp that clamps the electric wire. The electric wire hand cuts off the end of a tape wound up around the electric wire during the course of removing the electric wire at a fixed timing by interlocking with other parts according to a control unit. Therefore, a separate process for cutting off the end of a wound up tape becomes unnecessary, thereby making it possible to continuously and rapidly remove an electric wire.

1 Claim, 8 Drawing Sheets

TAPING DEVICE

CROSS REFERENCE TO RELATED APPLICATION

This application claims the benefit of related Japanese Application No. JP 10-11627, filed Jan. 23, 1998, the disclosure of which is expressly incorporated herein by reference in its entirety.

BACKGROUND OF THE INVENTION

1. Field of the Invention

The present invention relates to a taping device. More specifically, the present invention relates to a taping device by which a worker carries out taping work for a shielding wire on a table.

2. Background and Material Information

In general, wire harnesses and sub-assemblies which make up the wire harness are electric wiring systems which constitute fixed electric circuits bundling a number of wires. Taping work is often required in order to unify the bundled electric wires and for the purpose of insulation and the like. Up until now, various taping devices have been developed in order to facilitate such taping work.

For example, in Japanese Patent Publication (Unexamined) No. HEI 7-61415, a taping head and a taping device are disclosed. A taping head forms a U-shaped opening on an almost disc type rotational member which is driven by a rotational drive source, such as a motor. The taping device has a tape holder installed on the taping head. According to the prior art taping device, when adhesive tape, held in the tape holder, is wrapped around the electric wire, which was inserted in the U-shaped opening, and adhered and wrapped around the electric wire, a worker manually moved the tape head along the longitudinal direction of the electric wire by holding a handle which included the case of the rotational drive source.

Other taping devices, such as disclosed in Japanese Patent Publication (Unexamined) Nos. HEI 6-183413 and SHO 59-224013 are equipped with a movement mechanism. The movement mechanism contains a rotational member and is able to be moved in both directions at least along one axis. The movement mechanisms are constituted so that taping work can be automatically carried out by moving the taping head with the movement mechanism against an electric wire which is previously wired or fixed on a working table. Moreover, a taping device, such as that disclosed in Japanese Patent Publication (Unexamined) No. SHO 59-224013, discloses a construction in which a cutter cutting a tape after winding is driven by an air cylinder.

Any of the above-mentioned taping devices is suitable for taping long electric wire bundles. However, each of the prior art taping devices is not suitable for taping relatively short electric wires.

In particular, taping devices which require manual movement of the taping head such as the taping device disclosed in Japanese Patent Publication (Unexamined) No. HEI 7-61415 are inferior because the work must be carried out while one hand of the operator is occupied holding a shielding wire. Because the shielding wire is obtained by covering a number of covered wires with a ground wire further covering the ground wire with a sheath, the essential part of taping the shielded wire occurs when the ground wire, the covered wire and the like are separate pieces, it is extremely difficult to carry out taping with one hand.

On the other hand, in taping devices, such as those disclosed in Japanese Patent Publication (Unexamined) Nos. HEI 6-183413 and SHO 59-224013, because the electric wire is previously fastened, the winding of the tape can be easily carried out. However, the fixation and removal of the electric wire is often required in the case of short electric wires. The fixation and removal work of the electric wire is difficult and as a result, there is a problem that the ability to work is inferior.

SUMMARY OF THE INVENTION

The present invention pertains to the above-mentioned problem and therefore provides a taping device which can efficiently carry out the taping work of a short length electric wire.

DETAILED DESCRIPTION OF THE PREFERRED EMBODIMENTS

In order to solve the above-mentioned problems, a taping device is provided in which an electric wire hand holds a clamped wire and removes the clamped wire from an electric wire clamp. A control procedure controls the electric wire clamp, the electric wire hand and a taping head so that adhesive tape may be cut by the cutter of the taping cutter in a motion when the electric wire hand removes the electric wire from the electric wire clamp after taping. The taping device tapes the clamped electric wire along a direction in a known manner, such as described in the previously mentioned Japanese patent publications. The taping device includes the electric wire clamp removably clamping the electric wire being taped.

The taping head winds the adhesive tape around the outer surface of the clamped electric wire and includes a cutter for cutting wound tape. An alternate movement procedure is provided in which the taping head moves from a starting edge to an ending edge along the direction. After taping, the taping head is returned to the starting edge at a fixed time.

According to the present invention, a worker can carry out taping work by merely clamping an electric wire with an electric wire clamp and moving the taping head according to the alternate movement procedure. The electric wire is passed from the electric wire clamp to the electric wire hand after completing the taping, and the motion of removing the electric wire clamp is automatically performed. Further, because the tape wound on the electric wire is cut in the process of the movement which removes the electric wire hand, both the process of removal and the process of cutting the tape are simultaneously carried out. Further, it becomes unnecessary to drive a cutter to cut the tape. In addition, removal of the electric wire is automatically carried out and as a result, the worker is able to continuously repeat the taping work by only feeding the electric wire, that is clamping the wire to the electric wire clamp.

Figure 1:
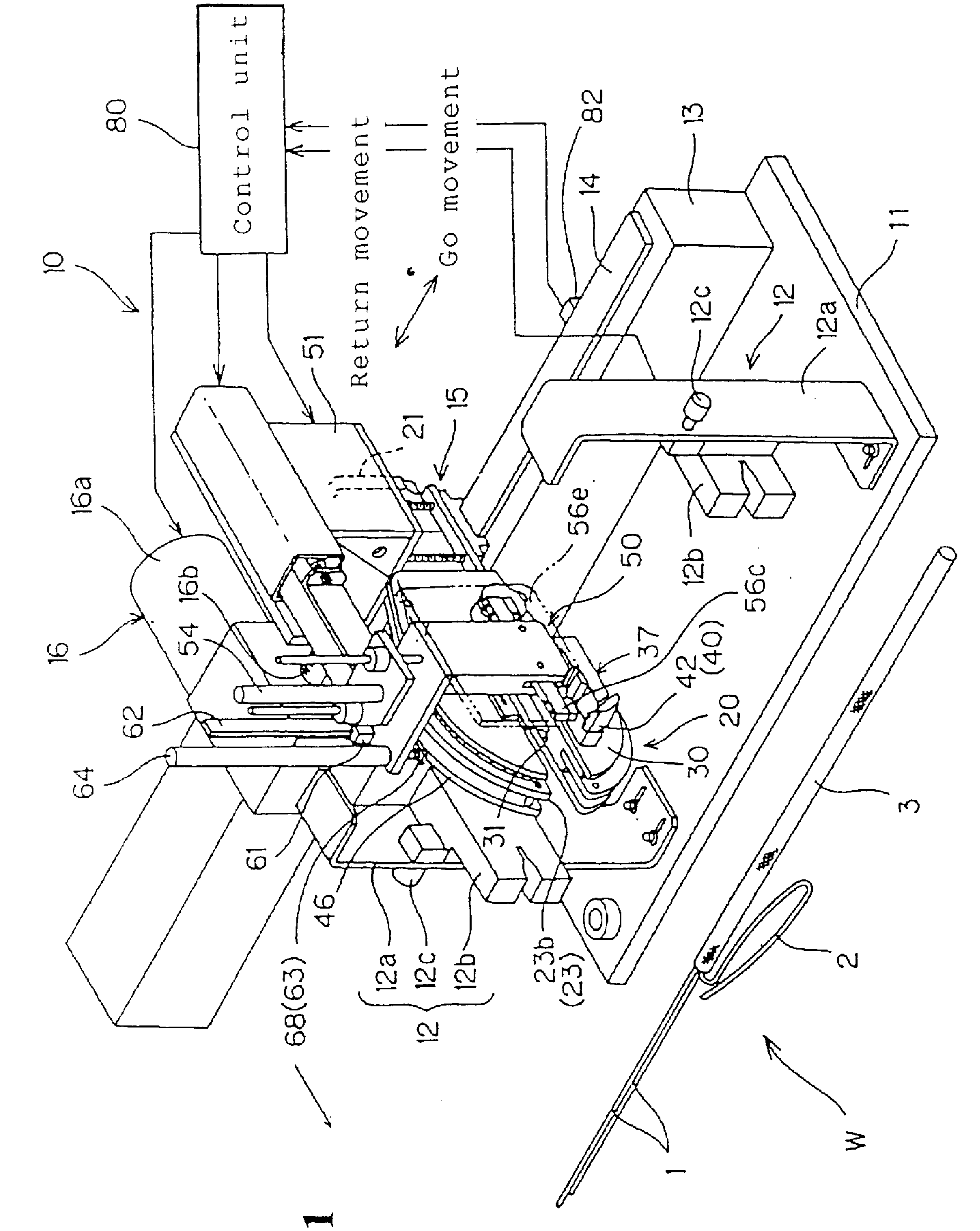
FIG. 1 is a perspective view showing the general construction of the taping device in one mode of operation of the present invention.

A preferred embodiment is described with reference to FIG. 1. FIG. 1 shows the outline construction of the taping device. A desktop version of the taping device 10 is shown and facilitates taping the shielding wire W. In the example shown in FIG. 1, after an ground wire 2 covering a covered wire 1 is stripped from the sheath 3, the shielding wire W is one which was obtained by previously twisting the ground wire 2 in a form of wire. Furthermore, a side facing the worker is temporarily defined as the front in the illustration.

The taping device 10 is equipped with a base plate 11 formed in an approximately rectangular shape which extends longer in the left and right directions as seen in FIG. 1. A pair of electric wire clamps 12 are installed on both sides of the front edge part of the base plate 11. Each of the wire clamps 12 is equipped with pillars 12*a* installed on the base plate 11. Manipulators 12*b* are fixed on the pillars 12*a*, and switches 12*c* are provided for opening and closing the manipulators 12*b*. Both end of the shielding wire W are nipped by the clamps 12 and the shielding wires can be removably fastened such that they are stretched along a horizontal direction.

A slide rail base 13 is installed along a longitudinal direction near the rear edge of the base plate 11. One side protrudes slightly past the edge of the base plate 11 (the left side of FIG. 1). A rail 14 is installed on the slide rail base 13. A slide unit 15 is installed on the rail 14 and can be moved along the rail 14.

The slide unit 15 supports a taping head 20, which is described below in detail. The slide unit enables alternate movement of the taping head 20 along the rail 14. The edge of the slide rail base 13 which protrudes is equipped with a rack mechanism 16 in order to alternately move the taping head 20 to the left and to the right. The rack mechanism 16 is provided with a motor 16*a* and a rack 16*b* which is alternately moved to the left and to the right via a pinion (not illustrated) and rotationally moved by the motor 16*a*. The taping head 20 is designed to be able to be alternately moved to the left and to the right through the slide unit 15 by fixing the protruding edge of the rack 16*b* on the slide unit 15.

Figure 2:
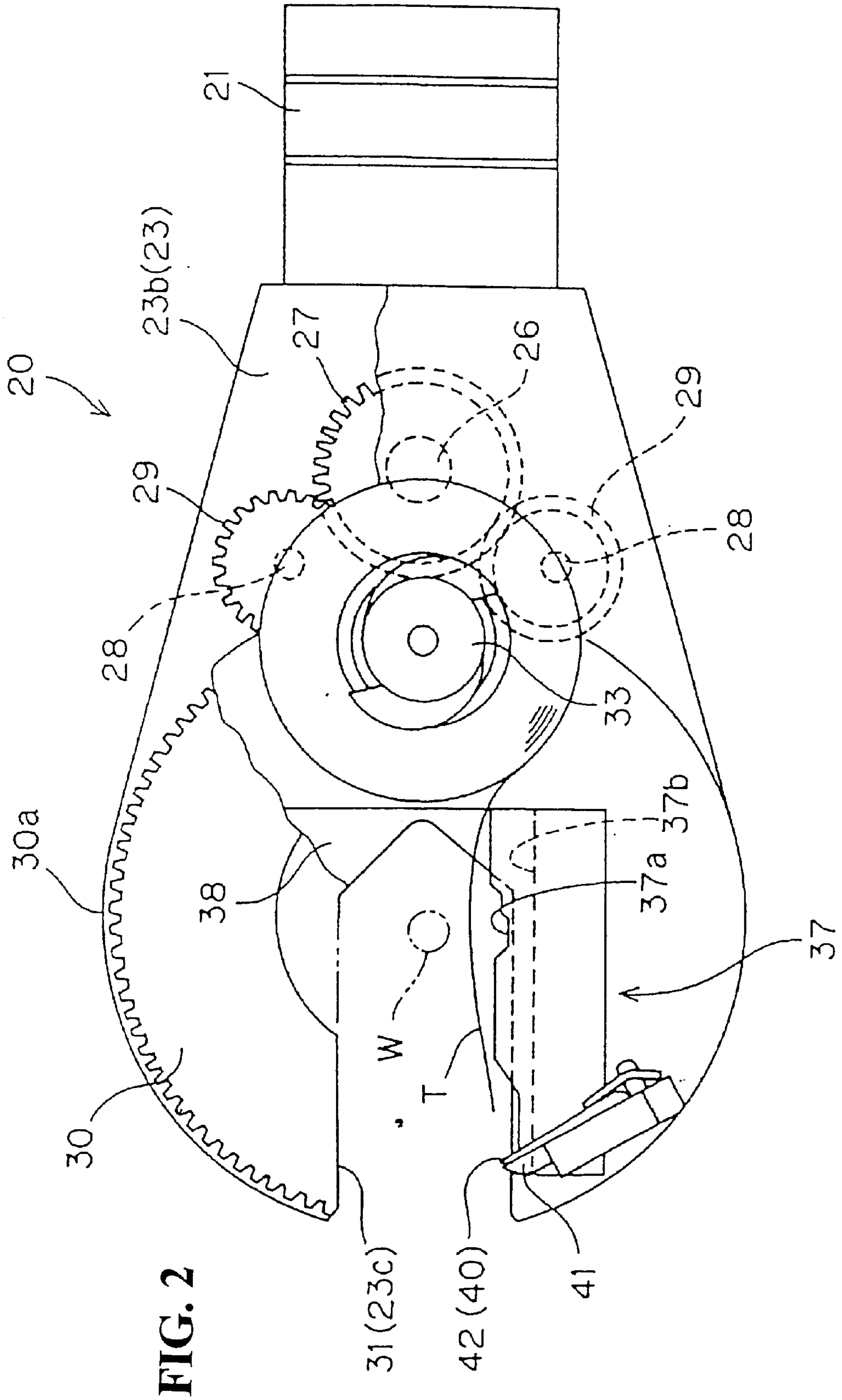
FIG. 2 is a front view showing a part of the taping head relating to the mode of operation of FIG. 1.
Figure 3:
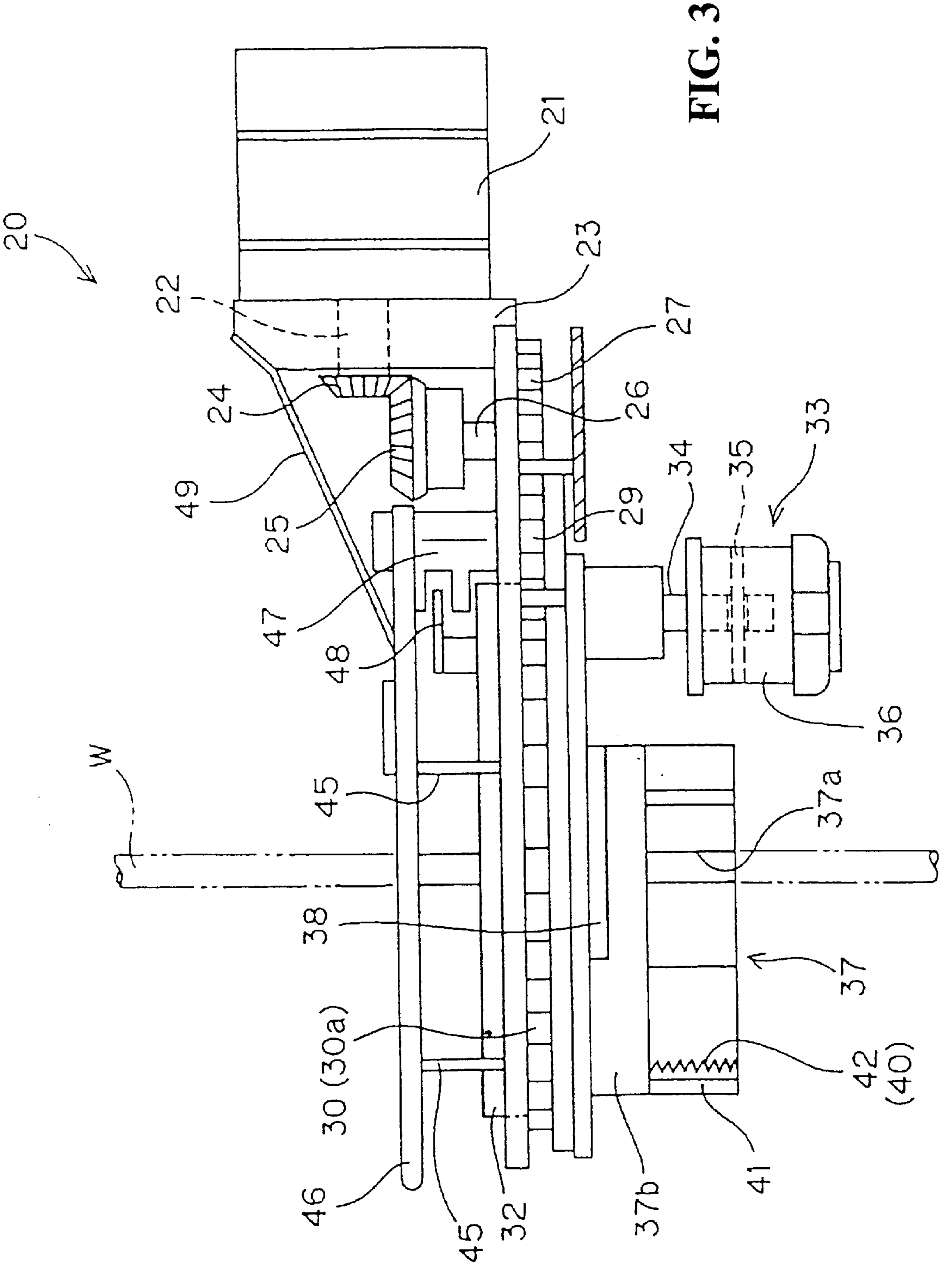
FIG. 3 is a plan view showing a part of the taping head of FIG. 2.
Figure 4:
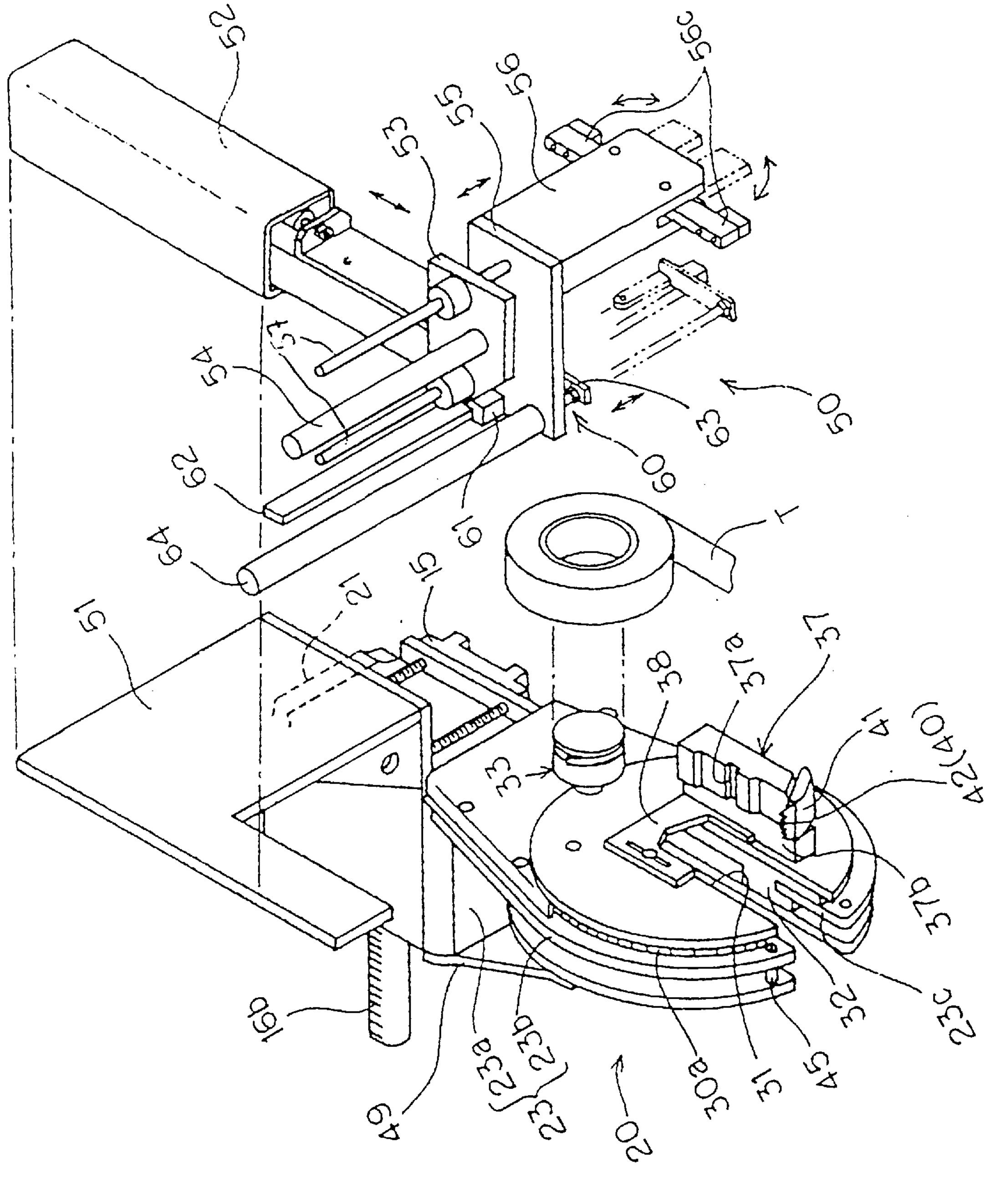
FIG. 4 is a perspective view showing an essential part of the mode of operation of FIG. 1.

FIG. 2 is a schematic front view with a portion broken away to show a portion of the taping head 20 relating to the mode of operation in FIG. 1. FIG. 3 is a schematic plan view with a portion broken away to show a part of the taping head 20 of FIG. 2. Further, FIG. 4 is a perspective view showing an essential portion of the mode of operation in FIG. 1.

Referring to these figures, the taping head 20 is equipped with a stepping motor 21. The stepping motor 21 is mounted on the slide unit 15 and fixed in a position in which a rotational axis 22 extends towards the front of the taping device 10 (to the side of a worker) as shown in FIG. 3.

An installation plate 23 is fixed on a housing part of the stepping motor 21. The stepping motor 21 has an approximately L-shaped steel plate integrally formed of a plate part 23*a* and an installation part 23*b*. The plate part 23*a* intersects the rotational axis 22 of the stepping motor 21, and the installation part 23*b* is perpendicularly connected with the plate part 23*a*.

Referring to FIG. 3, a drive side bevel gear 24 is fixed on the rotational axis 22 of the stepping motor 21. A movement side bevel gear 25 is arranged on the rear side of the installation part 23*b* and meshes with the drive side bevel gear 24.

A shaft 26 of the movement side bevel gear 25 penetrates the installation part 23*b* and is supported so as to be able to rotate. A spur gear 27 is fixed on the other side of the installation part 23*b*. The spur gear 27 is fixed on the shaft 26 on the front side of the installation part 23*b*. The rotational center of the spur gear 27 lies along a horizontal line passing through the shielding wire W when it is clamped by the electric wire clamps 12. The spur gear 27 meshes with a pair of intermediate gears 29 which are rotationally supported by the respective axles 28 on the front side of the installation part 23*b*. Each of the intermediate gears 29 is arranged symmetrically above and below the horizontal line which passes through the center of the spur gear 27. Each of the intermediate gears 29 meshes with a partial gear 30*a* of a rotational member 30. The rotational member 30 rotates about a rotational center equivalent to the shielding wire W when it is clamped by the electric wire clamps 12. The intermediate gears 29 enable transfer of the driving force from the bevel gear 24 to the partial gear 30*a*.

The rotational member 30 is a disc member equipped with a U-shaped concave portion 31 which extends in a radial direction through a central portion of the rotational member 30. A boss part 32 of the reverse side (refer to FIG. 4) is rotatably mounted on the inner surface of the installation part 23*b*. Therefore, it is rotatably supported around the shielding wire W. Furthermore, a concave part 23*c* which faces the concave part 31 is formed along the horizontal line. Consequently, interference with the shielding wire W is avoided by the concave part 23*c* and concave part 31.

On an outer surface of the rotational member 30, a tape holder 33 is provided to rotatably install the adhesive tape T. As shown in FIG. 3, the tape holder 33 has a shaft 34 fixedly mounted to the rotational member 30. A retention member 36 is pivotally connected with the shaft 34 through pin 35 which extends in a radial direction of the shaft 34. The adhesive tape T is designed to be kept in a condition such that it can be dispensed, by installing the adhesive tape T on the outer surface of the retention member 36.

A guide block 37 is provided for positioning the shielding wire W where the dispensed adhesive tape is wound. The guide block 37 is fixed with screws and is adjustable, through an installation plate 38 integrally formed therewith. As shown in FIG. 2, an upper portion of the guide block 37 coincides with the concave part 31 of the rotational member 30, viewed from the front of the taping head 20. Further, a positioning concave part 37*a* for positioning the shielding wire W is formed on the upper face of the guide block 37. The edge wall of the guide block 37 inclines along the tangent direction of the rotational member 30 and makes an acute angle with the concave part 31. The guide block 37 holds a cutter 40 on an edge. The cutter is fixed on the guide block 37 and only its blade 42 is exposed on the upper edge. The rest of the cutter is covered with a safety cover 41.

Referring to FIG. 3, a cover plate 46 is installed on the installation part 23*b* of the installation plate 23 with stud pins 45. The cover plate 46 covers the boss part 32 of the rotational member 30. An optoelectronic sensor 47 is installed on the cover plate 46 and a dog 48 is detected by the optoelectronic sensor 42. The dog 48 is mounted on the boss part 32 of the rotational member 30. The phase of the rotational member 30 is detected by the optoelectronic sensor 47 and the dog 48. Thus, the stop position is able to be finely controlled. Further, a subsidiary cover 49 covers the bevel gears 24, 25 and is fixed between the cover plate 46 and the plate part 23*a* of the installation part 23. As shown in FIGS. 1 and 4, the rotational member 30 is designed to be able to be precisely stopped in the position shown in the figures by detecting the phase according to the optoelectronic sensor and adopting the stepping motor 31. At the stopping position, the cutter 40 is stopped in the position in which the blade 42 is set upward at a position slightly forwardly deviated from the shielding wire W which was fixed by the electric wire clamps 12.

Figure 5:
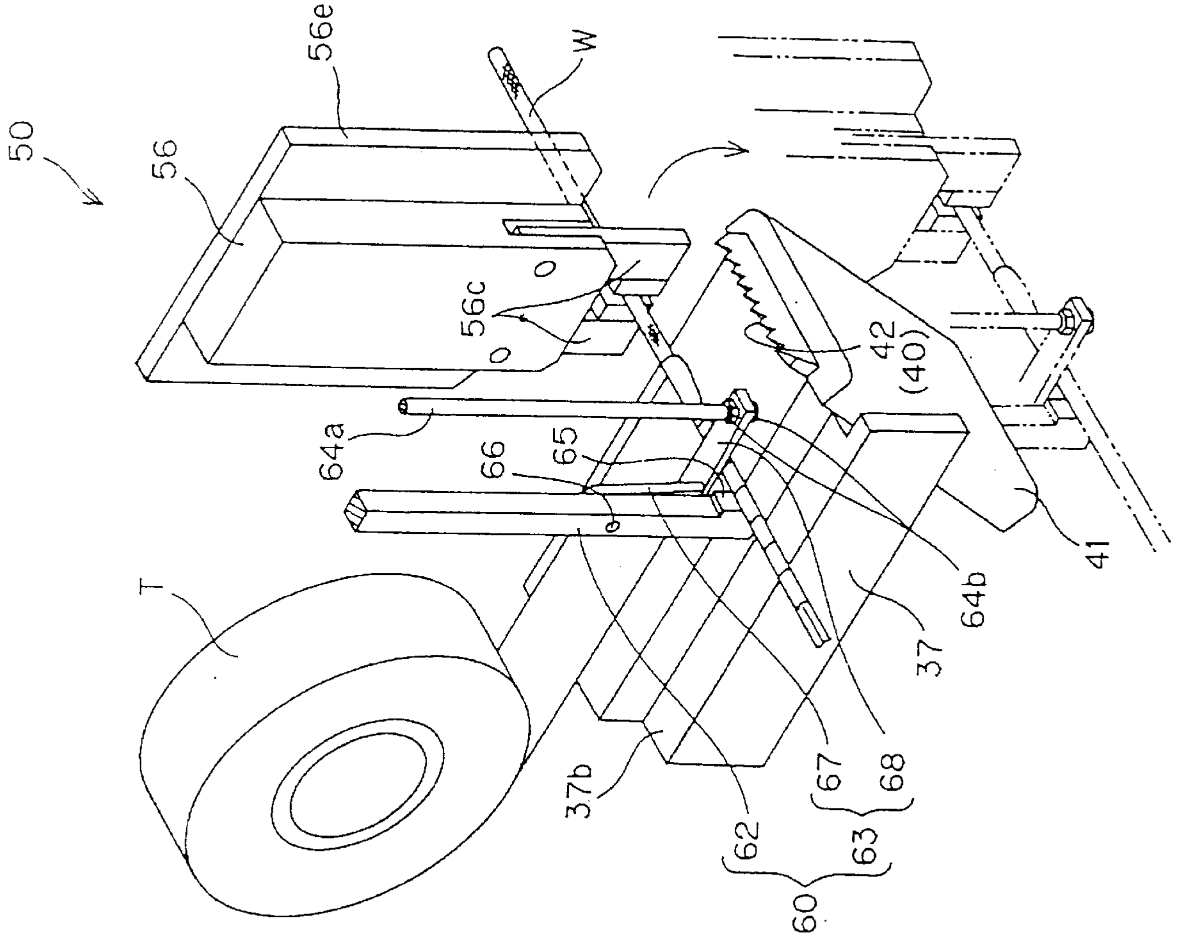
FIG. 5 is a perspective view showing the motion of the electric wire hand of the taping device relating to the mode of operation of FIG. 1.

Referring to FIGS. 1, 4 and 5, the electric wire hand is illustrated in detail. FIG. 5 is a perspective view showing the motion of the electric wire hand of the taping device. A bracket 51 is installed on the slide unit 15 supporting the taping head 20. The electric wire hand is mounted on the bracket 51. The electric wire hand 50 includes a level actuator 52, a supporting plate 53, an air cylinder 54 and an elevator plate 55. The level actuator 52 extends horizontally in front of and behind the taping device 10. The supporting plate 53 is driven in a forward and rearward direction by the level actuator 52. The air cylinder 54 is mounted on the supporting plate 53. The elevator plate 55 goes up and down in response to the air cylinder 54. A manipulator 56 is provided to hold the shielding wire W, and a guide unit 60 is provided to guide the shielding wire W to a fixed transfer direction described below.

The level actuator 52 is designed to be able to alternately move the supporting plate 53 between a position in which the manipulator 56 and the guide unit 60 are positioned near the shielding wire W taped by the taping head 20 and a second position. In the second position, both the manipulator 56 and the guide unit 60 are moved forward of the taping device 10 and the manipulator 56 and the guide unit 60 protrude forward of the cutter 40 when the taping head 20 is stopped at the position shown in FIGS. 1 and 4.

The supporting plate 53 is connected with the elevator plate 55 by a pair of guide bars 57 mounted on the left and right sides of the elevator plate 55. The guide bars 57 facilitate upward and downward motion of the elevator plate 55 relative to the supporting plate 53.

The up and down motion is caused by the air cylinder 54 installed on the supporting plate 53. The air cylinder 54 is constructed so that the elevator plate 55 can change between an upper position (refer to the solid lines of FIG. 5) in which the manipulator 56 and the guide unit 60 face upward so that they can clamp (or guide) the shielding wire W to be taped. Alternatively, a lower position (refer to the broken line view of FIG. 5) is possible in which the manipulator 56 and the guide unit 60 descend below the cutter 40 of the taping head 20 which is stopped in the condition shown in FIG. 1. As a result, after the shielding wire W is held by the manipulator 56 and guided by the guide unit 60, the shielding wire W is transferred forward of the cutter 40 and the adhesive tape T is cut by the cutter 40 by the descending motion. Simultaneously, the shielding wire W is removed from the electric wire clamp 12.

Referring to FIGS. 4 and 5, the manipulator 56 and the guide unit 60 are respectively mounted to the left and right of the cutter 40 at a position where both do not interfere with the cutter 40. The manipulator 56 is a well known unit constructed so that a pair of nipping fingers 56c, installed on the lower part, are symmetrically rotated by driving an inner link mechanism and the like with pressurized air fed through a pipe (not shown). Thus, the nipping fingers 56*c* can open and close to grab and release the shielding wire W.

The pair of nipping fingers 56*c* are arranged so as to be pivoted in a plane orthogonal to the shielding wire W. The shielding wire W is nipped between both nipping fingers 56*c* which contact each other in an approximately vertical direction when clamping. Upon disconnection, the nipping fingers 56*c* move to an approximately horizontal position and do not interfere with the adhesive tape T wound on the shielding wire W.

Furthermore, when the shielding wire W receives an external force during taping, it is designed to prevent the ground wire 2 from being entangled with the nipping fingers 56*c* by fixing a guard plate 56*e* on a side portion of the manipulator 56.

The guide unit 60 provides tension to the shielding wire W between the nipping fingers 56c, and is utilized for sending out the rear side of the shielding wire W in a forward and downward direction. In order to exhibit such action, the guide unit 60 is equipped with a slide guide 61 installed on the elevator plate 55, a slide bar 62 guided up and down by the slide guide 61, pressurizing pin 63 installed near the lower edge of the slide bar 62, and an air cylinder 64 connected with the pressuring pin 63.

As seen in FIG. 5, the slide bar 62 contacts the rear side of the shielding wire W on its front and lower edge portion 65. The slide bar 62 carries out the positional regulation of the shielding wire W. The slide bar 62 is guided so as to be able to ascend and descend. The slide guide 61 guides the slide bar 62 so that the slide bar 62 can ascend and descend at a slight incline so that the shielding wire W does not loosen between the nipping fingers 56*c* during the positional regulation. The lower portion of the slide bar 62 is slightly inclined forwardly with respect to the upper portion thereof. Thus, the inclination motion of the slide bar 62 is such that the bottom of the slide bar 62 moves forwardly as it is moved downwardly to cut the tape. As described below, a supporting piece 67 allows the inclining motion. Furthermore, although not illustrated, an anti-slipping mechanism may be provided, such as a perforation, slit or the like, on the front of the lower edge 65 in order to prevent the shielding wire W from positionally deviating.

The pressuring pin 63 is integrally formed by the supporting piece 67 and a pressuring pin 68. The supporting piece 67 is axially supported on a side portion of the slide bar 62 by a supporting pivot 66 which is parallel with the fastened shielding wire W. The pressuring piece 68 has a base edge side that is welded to the lower edge of the supporting piece 67 and has a free edge side which extends forwardly. The shielding wire W is designed to be guided in combination by the front lower portion 65 of the slide bar 62 and the lower face of the pressuring pin 68. A gutter 37*b* is formed on the guide block 37 in order to prevent interference when the lower edge potion of the slide bar 62 and the pressuring pin 63 descend.

The air cylinder 64 is fixed on the elevator plate 55 in a position in which a downward facing rod 64*a* is driven up and down. The rod 64*a* is connected with the free edge of the pressuring piece 68 of the pressuring pin 63. The pressuring pin 63 and the lower portion of the slide guide 61 are designed to be able to ascend and descend to an evacuation position for evacuating to the upper part of the shielding wire W, and a guiding position for guiding the shielding wire W.

As described above, because the lower portion of the slide bar 62 inclines forwardly with respect to the upper portion, a gap between the lower edge potion of the slide bar 62 and the rod 64*a* differs during ascent and descent of the slide bar 62. Therefore, in order to absorb the variation of the gap, the supporting piece 67 of the pressuring pin 63 is pivotally connected around the supporting pin 66, and is connected with the rod 64*a* to permit pivoting to achieve a fixed clearance between a pair of nuts 64*b* fixed on the tip of the rod 64*a* and the lower edge portion of the slide bar 62.

Figure 6:
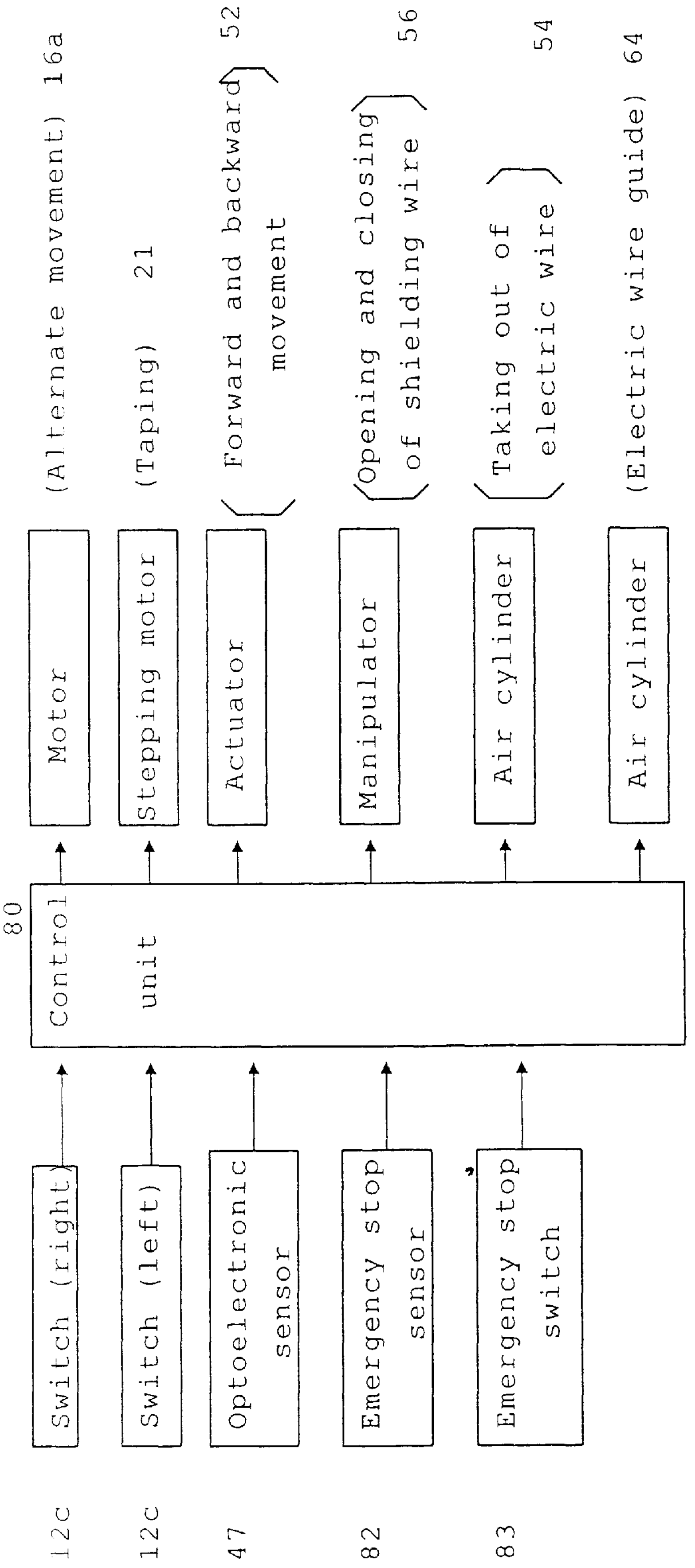
FIG. 6 is a block diagram of the control unit relating to the mode of operation of FIG. 1.

FIG. 6 is a block diagram of a control unit 80. The control unit 80 facilitates the taping motion by controlling the above-mentioned parts. The control unit 80 comprises a microprocessor and is equipped with switches 12*c* (one for the left electric wire clamp 12 and one for the right electric wire clamp 12), the optoelectronic sensor 47 for controlling the rotational member 30 of the taping head 20, and the slide rail base 13 for controlling the movement of the rack mechanism 16. The microprocessor also includes an emergency stop sensor 82 for forcing stopping of the movement of the slide unit 15 before the movement exceeds a fixed distance due to any reason. Also provided is a switch 83 for causing the emergency stop. The switch is installed on the base plate element and has an input element. On the other hand, the control unit 80 is constructed so that the respective manipulators 12*b* of the electric wire clamp 12, the motor 16*a* of the rack mechanism 16, the motor 21 of the taping head 20, the level actuator 52 of the electric wire hand 50, the air cylinder 54, the manipulator 56 and the air cylinder 64 can be driven.

Figure 7:
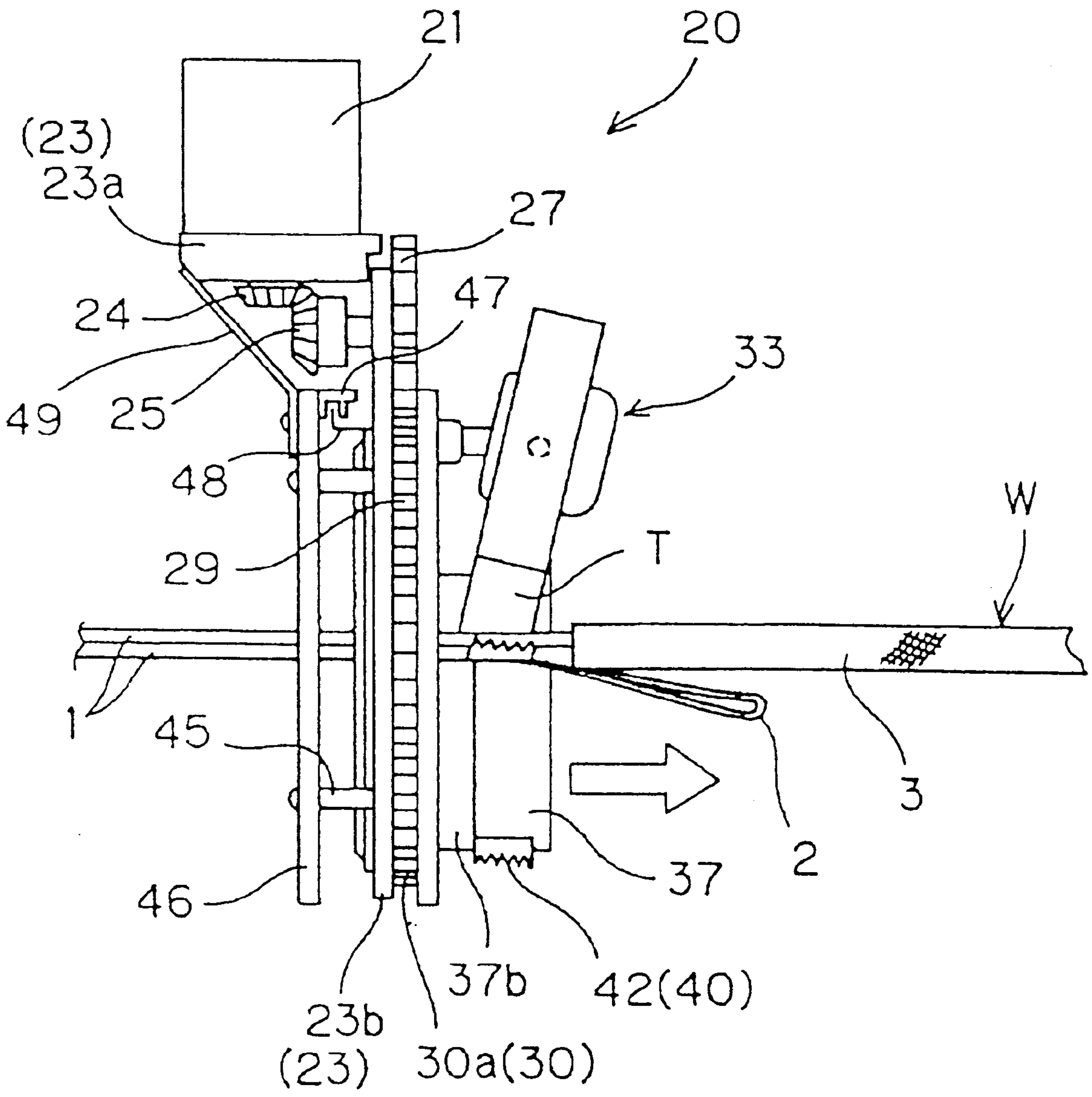
FIG. 7 is a partial plan view showing the process of the taping motion relating to the mode of operation of FIG. 1.
Figure 8:
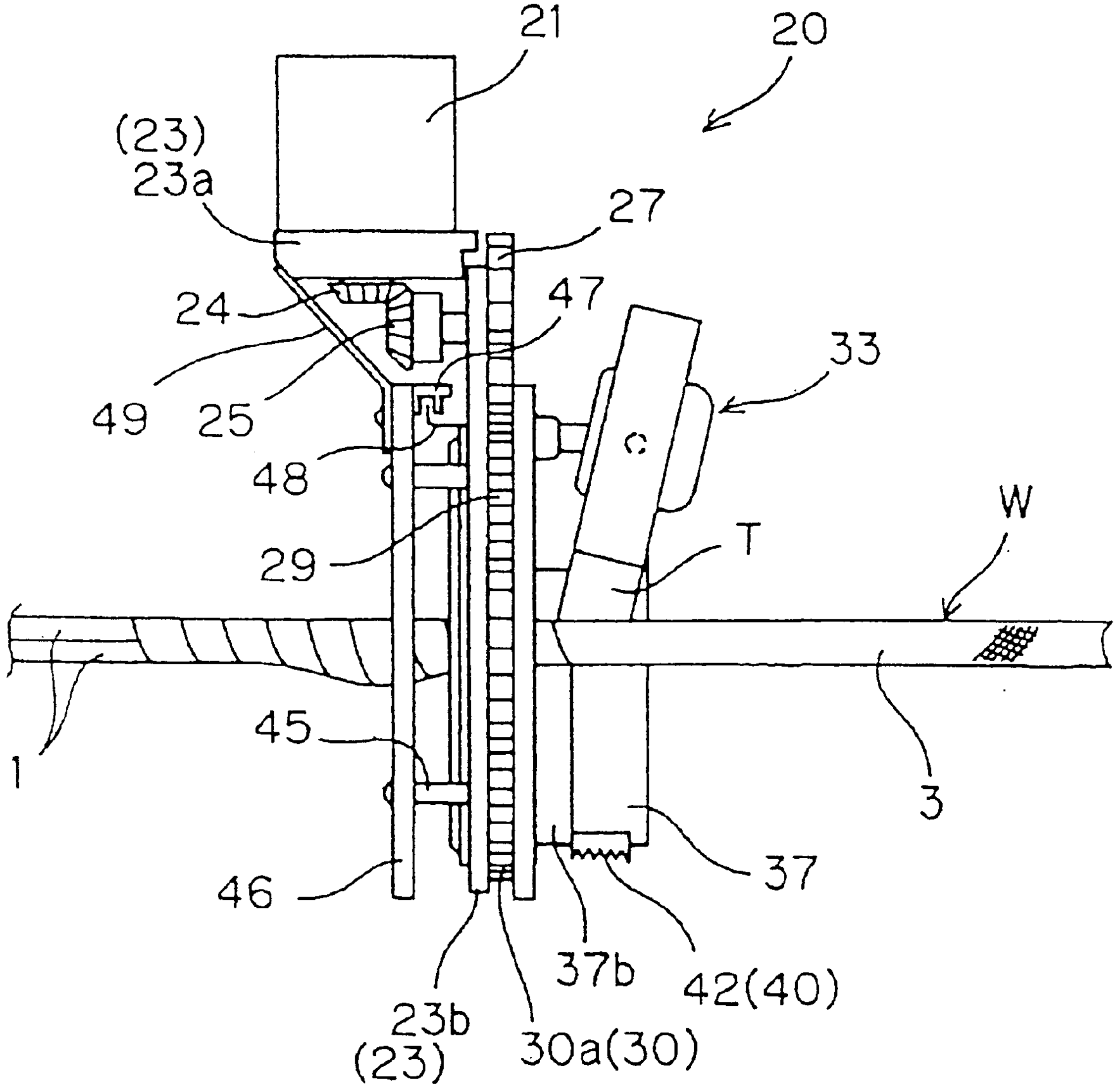
FIG. 8 is a partial plan view showing the process of the taping motion relating to the mode of operation of FIG. 1.

The taping work proceeds under the control of the control unit 80. The motion of the operation is illustrated in FIGS. 7 and 8 which are partial plan views showing the process of the taping motion.

Initially, the taping head 20 stops in an initial state, as shown in FIGS. 1 and 5, setting the position adjacent to the electric wire clamp 12 at the left side of the figure as the home position. The rotational member 30 stops in the position where the concave part 31 faces forward towards the worker. The dispensed edge of the adhesive tape T installed on the tape holder 33 is slightly unrolled on the guide block 37 with the adhesive side exposed upwardly.

The worker then holds the shielding wire W and clamps one edge of the shielding wire W by operating the corresponding switches 12*c* of the electric wire clamps 12. The worker then mounts the taping essential part of the shielding wire on the adhesive tape laid out on the guide block 37, and the essential part of the adhesive tape T is temporarily hooked by folding as shown in FIG. 7.

Next the other edge of the shielding wire can be horizontally fixed in a state in which tension is added by operating the corresponding switch 12*c* of the electric wire clamp 12 and successively clamping both edges of the shielding wire W.

When one of the left and right switches is operated by itself, corresponding switch 12*c* of the electric wire clamp 12 facilitates opening and closing of the corresponding manipulator 12*b* of the electric wire clamp 12. After both ends of the shielding wire W are connected, the program of the control unit is designed so that a starting switch for starting the drive of the taping head 20 is activated when a worker simultaneously presses both buttons 12*c*. Accordingly, the worker simultaneously connects the respective switches 12*c* of the electric wire clamp 12 in order to start the operating of taping. Therefore, because the operation is not started until both hands of the worker leave the shielding wire W, the safety of the worker is ensured by preventing inaccurate motion of the taping device 10 caused by an improper operation.

When the worker regularly operates the respective switches 12*c*, the control unit 80 drives the motor of the rack mechanism 16 and the taping motion is started by simultaneously rotating the motor 21 of the taping head 20 while moving the taping head 20 through the slide unit 15. The distance the taping head moves via the rack mechanism 16 is set in the control unit 80 to stop the drive when, for example, a certain amount of the rack 16 is calculated and the calculated value reaches the established fixed value. Alternatively, when the sensor 82 detects the slide unit 15, when the limit switch is set at the emergency stop sensor, the rack mechanism may be stopped.

According to the taping motion, the adhesive tape T supported by the taping head 20 is wound on the outer surface of the shielding wire W as shown in FIG. 8. When the taping head finishes the lateral movement, the rotational member 30 of the taping head 20 stops at the position shown in FIG. 1. As shown in FIG. 5, the manipulator 56 of the electric wire hand 50 then nips the shielding wire W after closing the release condition shown in FIG. 1. The air cylinder 64 of the guide unit 60 causes the slide bar 62 to descend and the shielding wire W is pushed by the lower front portion of the slide bar 62 and the underside of the pressuring piece 68 of the pressuring pin 63 and is guided to be transferred. Then, the manipulator 12*b* of the electric wire clamp 12 automatically opens, and hands the shielding wire W to the electric wire hand 50. The electric wire hand 50 moves the shielding wire W received forward of the cutter 40 from the position where it was taped by moving the supporting plate 53 forward with the level actuator 52.

Then, as shown by the broken lines in FIG. 5, the shielding wire W which is retained between the manipulator 56 and the pressuring pin 63 descends while maintaining tension by descending the elevator plate 55 with the air cylinder 54. Consequently, the adhesive tape T is pushed onto the cutter 40 during the descent, and is cut. Then, after the manipulator 56 of the electric wire hand 50 releases the shielding wire W, the shielding wire W which is taped and cut free from the tape is removed from the electric wire clamp 12 and discharged. Then, the taping work can be continuously carried out by returning the respective parts to their original positions.

As illustrated above, when the shielding wire W is automatically taped with the taping head 20, the process of removing and the process of cutting the tape can be simultaneously carried out in one motion, therefore working efficiency by the electric wire hand 50 is improved and rapid removal work can be carried out. Further, as it becomes unnecessary to drive the cutter 40 in order to cut the adhesive tape T, it becomes possible to remove the shielding wire W after taping by a simple construction, and low cost execution becomes possible. Further, removing the shielding wire W is automatically carried out, and therefore it is possible to continuously repeat the taping work by only feeding the shielding wire W, that is clamping the electric wire clamp 12. Thus, the working efficiency is approved from this standpoint as well. Accordingly, the present invention exhibits a remarkable effect that the taping work of short length electric wire can be efficiently carried out.

While the invention has been described with reference to an exemplary embodiment, it is understood that the words which have been used are words of description and illustration, rather than words of limitation. Changes may be made within the purview of the appended claims, as presently stated and as amended, without departing from the scope and spirit of the invention. Although the invention has been described with reference to particular means, materials, and embodiments, the invention is not intended to be limited to the particulars disclosed. Rather the invention extends to all functionally equivalent structures, methods, and uses such as are within the scope of the appended claims.

What is claimed:

1. A taping device, comprising:

an electric wire clamp for detachably clamping an electric wire in a clamped condition;

a taping head for taping around the external circumference of the clamped electric wire with an adhesive tape, including a cutter for cutting a rolled tape; and a reciprocating movable mechanism for reciprocating said taping head along the above-mentioned direction from an initial side position of taping to an end side position, and reciprocally returning the taping head to the initial side position after the taping at a fixed timing, wherein the taping device for taping the clamped electric wire comprises:

an electric wire hand for detachably grasping the electric wire following removal of the clamped electric wire from the electric wire clamp; and a control unit for controlling the electric wire clamp, the electric wire hand, and the taping head in order that the adhesive tape can be cut off by a cutter of taping head during the course of the motion taken by the electric wire hand which takes off the electric wire after taping from the electric wire clamp.

* * * * *